H. A. HARVEY.
Bolt and Nut.

No. 197,466. Patented Nov. 27, 1877.

Witnesses:
Mary L. Adams.
Geo. H. Miatt

Inventor:
H. A. Harvey,
Pr. Edw. E. Lumby
Atty

UNITED STATES PATENT OFFICE.

HAYWARD A. HARVEY, OF ORANGE, NEW JERSEY.

IMPROVEMENT IN BOLTS AND NUTS.

Specification forming part of Letters Patent No. 197,466, dated November 27, 1877; application filed November 15, 1876.

*To all whom it may concern:*

Be it known that I, HAYWARD A. HARVEY, of Orange, New Jersey, have invented an Improvement in Bolts and Nuts, of which the following is a specification:

My improvement relates to that class of bolts and nuts in which the frictional hold of the nut upon the bolt is increased by the upsetting of the screw-threads, consequent upon the jamming of the nut against the shoulder through which the bolt passes. An example of this class of bolts is shown and described in the Letters Patent of the United States No. 154,864, dated September 8, 1874.

My present invention consists in so forming the male and female threads that both of them will be upset upon their edges when the structure is put into use. This object I accomplish by cutting what I call "barbed threads" on the bolt and corresponding threads on the nut. The effect resulting when the nut is set up tightly against the object through which the bolt passes is to upset the edges of both threads and to increase the depth of both threads. The edge of the bolt-thread jams outwardly against the bottom of the nut-thread, and the edge of the nut-thread jams toward the bottom of the bolt-thread. This modification of the shape of the threads extends only to those threads of the bolt which are embraced by the nut at the instant when the nut is set up tight. As the other threads of the bolt retain their normal shape, the nut can only be made to pass over them by the application of considerable force, and in use, therefore, no amount of jarring of the structure to which the bolt is applied will suffice to dislodge the nut.

Figure 1:
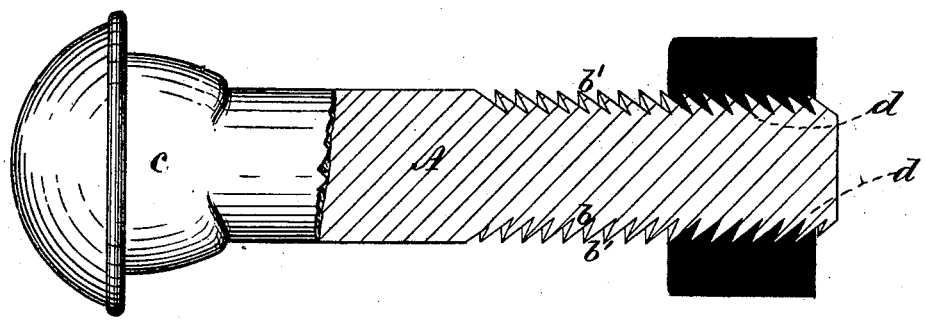
Figure 2:
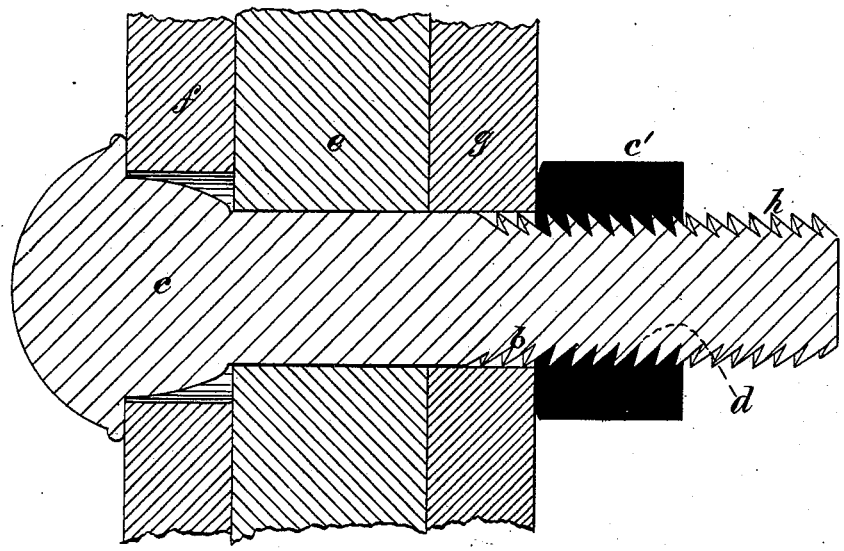

The accompanying drawings are as follows:

Figure 1 is a longitudinal section through the center of a bolt and nut exhibiting my improvement. Fig. 2 is a similar section, representing a bolt and nut in the position they occupy in use, and showing in an exaggerated degree the modified shape of the threads resulting from the setting of the nut hard against the object through which the bolt passes.

It will be seen that the bolt A presents in its section the appearance of a stem having the barbs $b$. This results from cutting under the upper side $b'$ of the thread. The edges of the threads, therefore, in their sections, present acute angles, the points of which are inclined toward the head $c$ of the bolt. The nut $d$ has its threads cut to fit the bolt-threads— that is, the nut-threads $d$ present the exact reverse of the bolt-threads.

By referring to Fig. 2, the operation of my invention will be easily understood. In this figure the bolt is represented as passing through three iron plates, the middle one of which, $e$, represents a cross-section of a rail, and the outer ones, $f$ and $g$, sections of the plates used in rail-joints. This drawing is an exaggerated representation of the effect produced by setting the nut $c'$ upon the bolt A hard up against the plate $g$ with a powerful wrench.

It will be seen that the points of the bolt-threads, in obedience to the pressure exerted upon them by the nut, are bent toward the point of the bolt, where the inner edges of the nut-threads, in obedience to the resistance exerted upon them by the bolt-threads, are bent in the opposite direction, and that thus the nut-threads no longer correspond in shape to the shape of the outer bolt-threads $h$.

In this drawing I have represented the effect in an exaggerated degree, for clearness of illustration. In practice, the upsetting of the threads will not be so great as is shown in the drawings; but it will be sufficient to change the shape of the nut-threads to such an extent that the nut, after having been set home, cannot be turned backward or released from the plate without the exertion of considerable force by the aid of a wrench—that is to say, the force required under such circumstances is much greater than could possibly result from any jarring effect upon the structure to which the bolt and nut are attached.

I claim as my invention—

The combination of a bolt having a barbed thread, substantially such as described, with a nut having a reversed barbed thread, substantially as and for the purposes set forth.

H. A. HARVEY.

Witnesses:
MARY L. ADAMS,
GEO. W. MIATT.